United States Patent
Song et al.

(10) Patent No.: US 12,008,789 B2
(45) Date of Patent: Jun. 11, 2024

(54) IMAGE SENSING DEVICE AND METHOD OF OPERATING THE SAME

(71) Applicant: SK hynix Inc., Gyeonggi-do (KR)

(72) Inventors: Jeong Yong Song, Gyeonggi-do (KR); Jae Yoon Yoo, Gyeonggi-do (KR); Ji Hee Han, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 240 days.

(21) Appl. No.: 17/534,276

(22) Filed: Nov. 23, 2021

(65) Prior Publication Data

US 2022/0398777 A1 Dec. 15, 2022

(30) Foreign Application Priority Data

Jun. 9, 2021 (KR) ........................ 10-2021-0074776

(51) Int. Cl.
*G06T 7/80* (2017.01)
*G06T 5/40* (2006.01)
*G06T 5/70* (2024.01)
*G06T 7/11* (2017.01)
*G06T 7/90* (2017.01)
*H04N 25/704* (2023.01)

(52) U.S. Cl.
CPC ............... *G06T 7/80* (2017.01); *G06T 5/40* (2013.01); *G06T 5/70* (2024.01); *G06T 7/11* (2017.01); *G06T 7/90* (2017.01); *H04N 25/704* (2023.01); *G06T 2207/20016* (2013.01); *G06T 2207/20182* (2013.01)

(58) Field of Classification Search
CPC .. G06T 7/80; G06T 5/002; G06T 5/40; G06T 7/11; G06T 7/90; G06T 2207/20016; G06T 2207/20182; G06T 5/008; H04N 25/704; H04N 23/81; H04N 25/11; H04N 25/70; H04N 5/21; H04N 25/60; H04N 25/75

See application file for complete search history.

(56) References Cited

U.S. PATENT DOCUMENTS

| | | | | |
|---|---|---|---|---|
| 8,547,451 | B2 * | 10/2013 | Cho | H04N 23/70 |
| | | | | 348/222.1 |
| 8,810,697 | B2 * | 8/2014 | Kawai | H04N 23/12 |
| | | | | 348/277 |
| 2018/0357750 | A1 * | 12/2018 | Chen | G06T 3/4038 |

FOREIGN PATENT DOCUMENTS

KR 10-1643319 B1 7/2016
KR 10-2018-0119050 A 11/2018

* cited by examiner

*Primary Examiner* — Ahmed A Berhan
(74) *Attorney, Agent, or Firm* — IP & T GROUP LLP (57) ABSTRACT

Provided herein may be an image sensing device and a method of operating the same. An image sensing device may include an image sensor obtaining an image using a plurality of pixels, and an image processor configured to use pixel values included in a region of interest included in the image to generate a gain table including gain table values corresponding to a first resolution, convert the gain table into a target table including target table values corresponding to a second resolution which is lower than the first resolution, and cancel noise included in the image based on the target table.

20 Claims, 8 Drawing Sheets

| Gr | R | Gr | R | Gr |
|----|----|----|----|----|
| B | Gb | B | Gb | B |
| Gr | R | Gr | R | Gr |
| B | Gb | B | Gb | B |
| Gr | R | Gr | R | Gr |

FIG. 4

| Gr | Gr | R | R | Gr | Gr | R | R |
|----|----|----|----|----|----|----|----|
| Gr | Gr | R | R | Gr | Gr | R | R |
| B | B | Gb | Gb | B | B | Gb | Gb |
| B | B | Gb | Gb | B | B | Gb | Gb |
| Gr | Gr | R | R | Gr | Gr | R | R |
| Gr | Gr | R | R | Gr | Gr | R | R |
| B | B | Gb | Gb | B | B | Gb | Gb |
| B | B | Gb | Gb | B | B | Gb | Gb |

FIG. 5

| Gr | Gr | Gr | R  | R  | R  | Gr | Gr |
|----|----|----|----|----|----|----|----|
| Gr | Gr | Gr | R  | R  | R  | Gr | Gr |
| Gr | Gr | Gr | R  | R  | R  | Gr | Gr |
| B  | B  | B  | Gb | Gb | Gb | B  | B  |
| B  | B  | B  | Gb | Gb | Gb | B  | B  |
| B  | B  | B  | Gb | Gb | Gb | B  | B  |
| Gr | Gr | Gr | R  | R  | R  | Gr | Gr |
| Gr | Gr | Gr | R  | R  | R  | Gr | Gr |

FIG. 6

| Gr | Gr | Gr | Gr | R  | R  | R  | R  |
|----|----|----|----|----|----|----|----|
| Gr | Gr | Gr | Gr | R  | R  | R  | R  |
| Gr | Gr | Gr | Gr | R  | R  | R  | R  |
| Gr | Gr | Gr | Gr | R  | R  | R  | R  |
| B  | B  | B  | B  | Gb | Gb | Gb | Gb |
| B  | B  | B  | B  | Gb | Gb | Gb | Gb |
| B  | B  | B  | B  | Gb | Gb | Gb | Gb |
| B  | B  | B  | B  | Gb | Gb | Gb | Gb |

FIG. 14

IMAGE SENSING DEVICE AND METHOD OF OPERATING THE SAME

CROSS-REFERENCE TO RELATED APPLICATION

The present application claims priority under 35 U.S.C. § 119(a) to Korean patent application number 10-2021-0074776, filed on Jun. 9, 2021, and which is incorporated herein by reference in its entirety.

BACKGROUND

Field of Invention

Various embodiments of the present disclosure generally relate to an electronic device, and more particularly to an image sensing device and a method of operating the image sensing device.

Description of Related Art

An image sensor is a device for capturing an image by using properties of semiconductors that react to light. With the recent development of computer and communication industries, there are growing demands for an image sensor with improved performance in various fields such as smartphones, digital cameras, game devices, Internet of things, robots, security cameras, and medical micro cameras.

The image sensor may be classified largely into a charge coupled device (CCD) image sensor and a complementary metal oxide semiconductor (CMOS) image sensor. The CCD image sensor has less noise and better image quality than the CMOS image sensor. The CMOS image sensor, however, is driven simply and may be implemented in various scanning methods. Furthermore, the CMOS image sensor makes it possible to integrate its signal processing circuits in a single chip, thereby making the product easily miniaturized and having low power consumption, with low manufacturing costs because it is able to compatibly use the CMOS process technology. The CMOS image sensing devices are popularly used these days due to their suitable properties for mobile devices.

SUMMARY

Various embodiments of the present disclosure are directed to an image sensing device and a method of operating the image sensing device, which perform with improved grid noise cancellation.

An embodiment of the present disclosure may provide for an image processing device. The image processing device may include a gain table generator configured to use pixel values included in a region of interest included in an image to generate a gain table including gain table values corresponding to a first resolution, a gain table binner configured to convert the gain table into a target table including target table values corresponding to a second resolution, and a calibrator configured to perform a calibration operation of cancelling a noise included in the image based on the target table.

An embodiment of the present disclosure may provide for an image sensing device. The image sensing device may include an image sensor configured to obtain an image using a plurality of pixels, and an image processor configured to use pixel values included in a region of interest included in the image to generate a gain table including gain table values corresponding to a first resolution, convert the gain table into a target table including target table values corresponding to a second resolution which is lower than the first resolution, and cancel a noise included in the image based on the target table.

An embodiment of the present disclosure may provide for an operating method of an image processing device. The operating method may include generating a M×M gain value array corresponding to a region of interest (ROI) of a 2M×2M pixel value array within an image, generating a N×N target value array and cancelling a noise of the image. A value of M is K times greater than a value of N. A gain value within the gain value array is obtained by dividing a first statistical representative value by a second statistical representative value. The first statistical representative value is of pixel values of an identical color to reference pixel values, each of which corresponds to the gain value, within the ROI. The second statistical representative value is of the reference pixel values. A target value within the target value array is a third statistical representative value of the gain values of a K×K sub gain value array corresponding to the target value, the K×K sub gain value array belonging to the M×M gain value array. The noise is cancelled by multiplying the target value to pixel values of K×K sub image arrays each corresponding to the target value, the K×K sub image arrays belonging to the image.

DETAILED DESCRIPTION

Specific structural or functional descriptions in the embodiments of the present disclosure introduced in this specification are only for description of the embodiments of the present disclosure. The descriptions should not be construed as being limited to the embodiments described in the specification.

Embodiments of the present disclosure will now be described with reference to accompanying drawings to describe technical ideas of the present disclosure for those of ordinary skill in the art to readily put them into practice.

Figure 1:
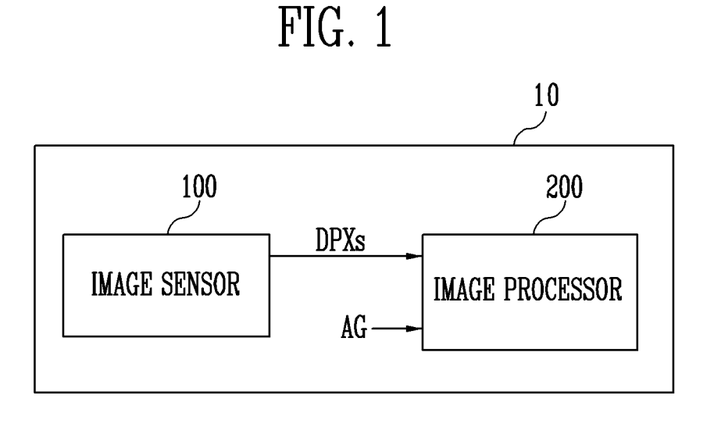
FIG. 1 is a diagram illustrating an image sensing device according to an embodiment of the present disclosure.

FIG. 1 is a diagram illustrating an image sensing device according to an embodiment of the present disclosure.

Referring to FIG. 1, an image sensing device 10 may include an image sensor 100 and an image processor 200.

The image sensing device 10 may be included in an electronic device, e.g., a digital camera, a mobile phone, a smartphone, a tablet personal computer (tablet PC), a notebook, a personal digital assistant (PDA), an enterprise digital assistant (EDA), a digital still camera, a digital video camera, a portable multimedia player (PMP), a mobile Internet device (MID), a PC, a wearable device, or a camera for various purposes (a front vehicle camera, a rear vehicle camera, blackbox camera, etc.).

The image sensor 100 may be implemented with a charge coupled device (CCD) image sensor or a complementary metal oxide semiconductor (CMOS) image sensor. The image sensor 100 may generate image data for an object (not shown) input (or captured) through a lens (not shown). The lens may include at least one lens that constitutes an optical system.

The image sensor 100 may include a plurality of pixels. The image sensor 100 may generate a plurality of pixel values DPXs corresponding to the captured image from the plurality of pixels. The plurality of pixel values DPXs generated by the image sensor 100 may be sent to the image processor 200. For example, the image sensor 100 may generate a plurality of pixel values DPXs corresponding to a single frame.

The image processor 200 may control the image sensor 100. Specifically, the image processor 200 may perform a process to enhance image quality of the pixel data received from the image sensor 100 and output the processed image data. The process may include electronic image stabilization (EIS), interpolation, color tone correction, image quality correction, size adjustment, etc. The image processor 200 may also be called an image processing device.

The image processor 200 may calibrate noise included in the image based on system information AG and the plurality of pixel values DPXs. The image may include maze noise. The maze noise may be a grid type noise caused by color imbalance between pixels of the same color among the plurality of pixels. The maze noise may be caused by color disparity between the pixels having the same color. In an embodiment of the present disclosure, the maze noise may be grid noise from crosstalk between a plurality of pixels.

The image processor 200 may calculate a calibration gain value for performing a calibration operation to reduce the maze noise based on the plurality of pixel values.

In FIG. 1, the image processor 200 may be implemented in a separate chip from the image sensor 100. In this case, a chip of the image sensor 100 and a chip of the image processor 200 may be implemented in a package, e.g., a multi-chip package. In an embodiment of the present disclosure, the image processor 200 may be included as part of the image sensor 100, so that the image processor 200 and the image sensor 100 may be implemented in a single chip.

Figure 2:
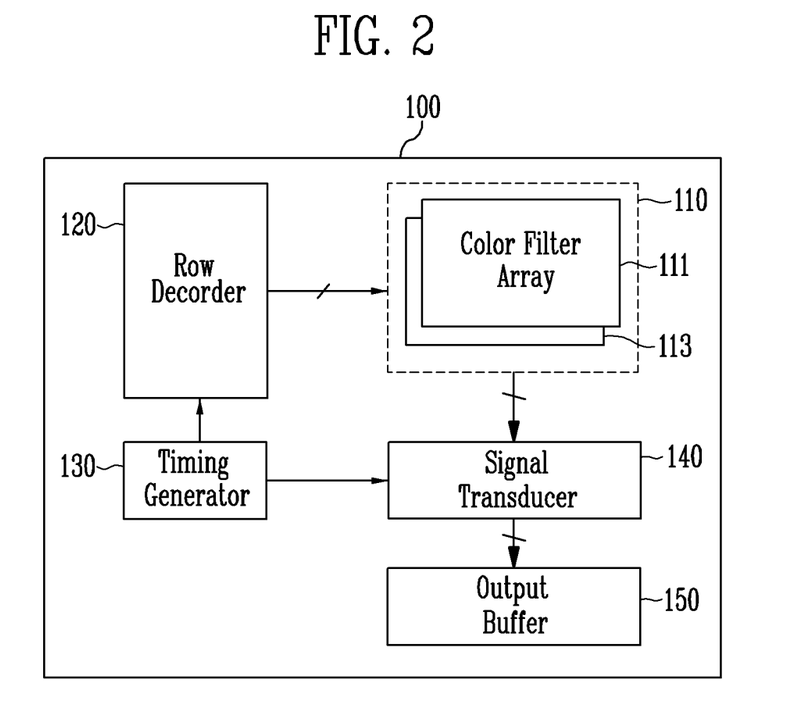
FIG. 2 is a diagram illustrating an image sensor of FIG. 1 according to an embodiment of the present disclosure.

FIG. 2 is a diagram illustrating the image sensor of FIG. 1 according to an embodiment of the present disclosure.

Referring to FIG. 2, the image sensor 100 may include a pixel array 110, a row decoder 120, a timing generator 130, and a signal transducer 140.

The pixel array 110 may include a color filter array 111, and a photoelectric conversion layer 113 formed under the color filter array 111 and including a plurality of photoelectric conversion elements corresponding to each pixel of the color filter array 111. The pixel array 110 may include a plurality of pixels that output color information included in incident light. Each of the plurality of pixels may output a pixel signal corresponding to incident light having passed through the corresponding color filter array 111.

The color filter array 111 may include color filters that pass only specific wavelengths (e.g., red, blue, and green) of light incident upon each pixel. With the color filter array 111, pixel data of each pixel may represent a value corresponding to intensity of light of a specific wavelength, and each pixel may be called a red pixel R, a blue pixel B, or a green pixel G depending on the type of the color filter.

Specifically, each of the plurality of pixels may accumulate photo charges generated according to incident light, and generate a pixel signal corresponding to the accumulated photo charges. Each pixel may include a photoelectric conversion element for converting a photo signal into an electric signal (e.g., a photo diode, a photo transistor, a photogate, or a pinned photo diode), and at least one transistor for processing the electric signal.

The pixel array 110 may include a plurality of pixels arrayed in rows and columns. The pixel array 110 may generate a plurality of pixel signals VPXs for each row. The plurality of pixel signals VPXs may each be an analog pixel signal VPX.

The row decoder 120 may select one of the multiple rows in which the plurality of pixels are arrayed, in response to address and control signals output from the timing generator 130.

The signal transducer 140 may convert the plurality of analog pixel signals VPXs into a plurality of digital pixel values DPXs. The plurality of digital pixel values DPXs may be output in various patterns. The signal transducer 140 may perform correlated double sampling (CDS) on each of the signals output from the pixel array 110, perform analog-to-digital conversion on the signal that went through the CDS, and output the digital signal, in response to control signals output from the timing generator 130. Each of the digital signals may be a signal corresponding to an intensity of a wavelength of incident light that has passed through the corresponding color filter array 111.

The signal transducer 140 may include a CDS block and an analog to digital converter (ADC) block. The CDS block may instantaneously sample and hold a set of a reference signal and an image signal provided for each of a plurality of column lines included in the pixel array 110. In other words, the CDS block may sample and hold a level of the reference signal and image signal corresponding to each of the columns. The ADC block may output pixel data resulting from conversion from the CDS signal for each column output from the CDS block to a digital signal. For this, the ADC block may include a comparator and a counter corresponding to each column.

Furthermore, in an embodiment of the present disclosure, the image sensor 100 may further include an output buffer 150. The output buffer 150 may be implemented with many buffers for storing digital signals output from the signal transducer 140. Specifically, the output buffer 150 may latch and output pixel data in a unit of a column provided from the signal transducer 140. The output buffer 150 may temporarily store the pixel data output from the signal transducer 140, and sequentially output the pixel data under the control of the timing generator 130. In some embodiments of the present disclosure, the output buffer 270 may be omitted.

Figure 3:
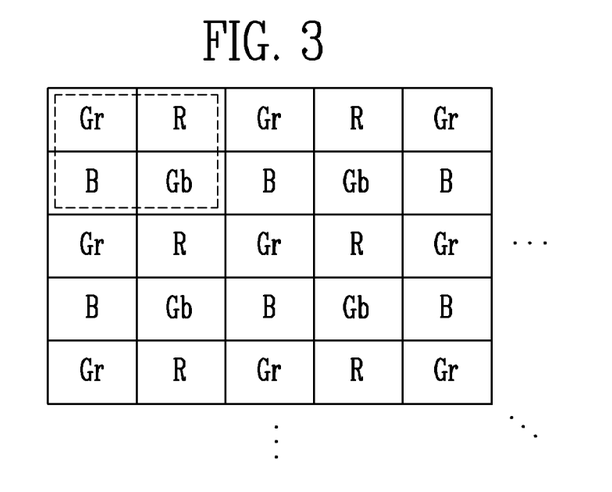
FIG. 3 is a diagram illustrating a Bayer pattern of a pixel array of FIG. 2 according to an embodiment of the present disclosure.

FIG. 3 is a diagram illustrating a Bayer pattern of the pixel array of FIG. 2 according to an embodiment of the present disclosure.

Referring to FIG. 3, the pixel array 110 may be arrayed in a predetermined pattern. For example, the pixel array 110 may be arrayed in a Bayer pattern. As represented in dotted lines in FIG. 3, the Bayer pattern may be repetitions of a cell of 2×2 pixels. In each cell, two pixels having green color filters, Gb and Gr, may be diagonally arranged, and a pixel having a blue color filter, B, and a pixel having a red color filter, R, may be arranged in the remaining corners. The four pixels B, Gb, Gr, and R are not limited to the arrangement shown in FIG. 3, but may be variously arranged yet based on the Bayer pattern.

Figure 4:
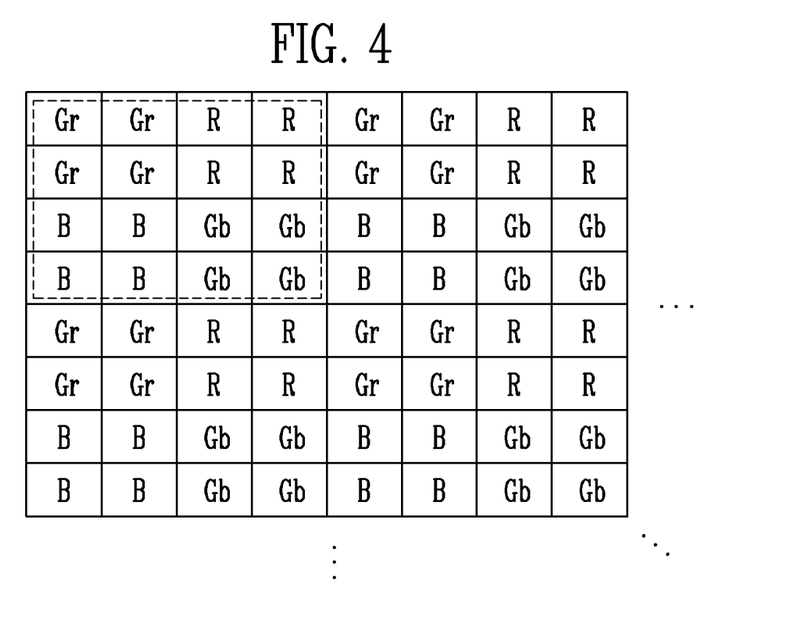
FIG. 4 is a diagram illustrating a quad Bayer pattern of the pixel array of FIG. 2 according to an embodiment of the present disclosure.

FIG. 4 is a diagram illustrating a quad Bayer pattern of the pixel array of FIG. 2 according to an embodiment of the present disclosure.

Referring to FIG. 4, the pixel array 110 may be arrayed in a predetermined pattern. For example, the pixel array 110 may be arrayed in a quad Bayer pattern. As represented in dotted lines in FIG. 4, the quad Bayer pattern may be repetitions of a cell of 4×4 pixels. In each cell, eight pixels having green color filters, Gb and Gr, may be diagonally arranged, and four pixels having blue color filters, B, and four pixels having red color filters, R, may be arranged in the remaining corners. The sixteen pixels B, Gb, Gr, and R are not limited to the arrangement shown in FIG. 4, but may be variously arranged yet based on the quad Bayer pattern.

Figure 5:
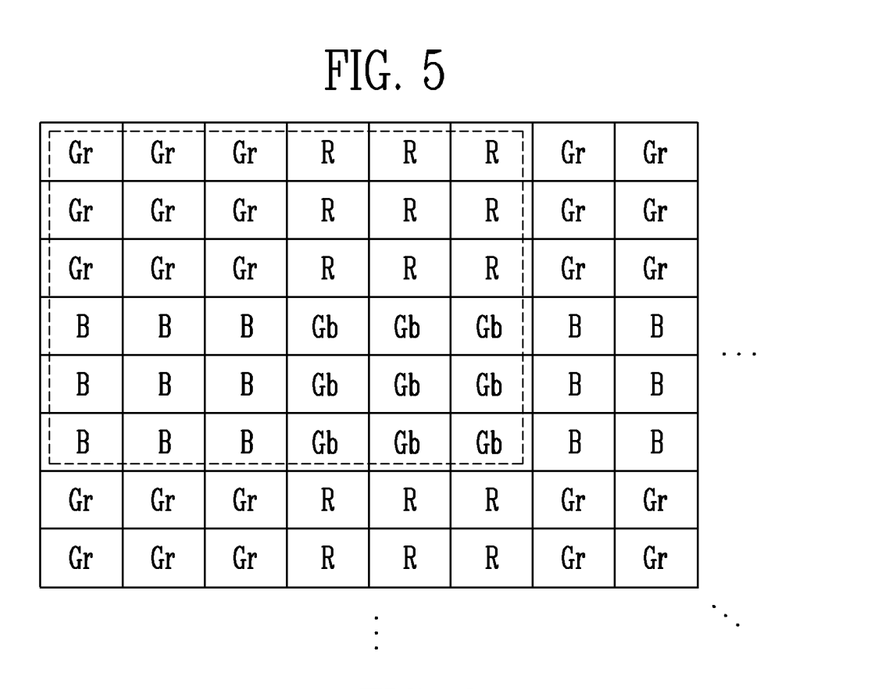
FIG. 5 is a diagram illustrating a nona-cell pattern of the pixel array of FIG. 2 according to an embodiment of the present disclosure.

FIG. 5 is a diagram illustrating a nona-cell pattern of the pixel array of FIG. 2 according to an embodiment of the present disclosure.

Referring to FIG. 5, the pixel array 110 may be arrayed in a predetermined pattern. For example, the pixel array 110 may be arrayed in a nona-cell pattern. As represented in dotted lines in FIG. 5, the nona-cell pattern may be repetitions of a cell of 6×6 pixels. In each cell, eighteen pixels having green color filters, Gb and Gr, may be diagonally arranged, and nine pixels having blue color filters, B, and nine pixels having red color filters, R, may be arranged in the remaining corners. The thirty six pixels B, Gb, Gr, and R are not limited to the arrangement shown in FIG. 5, but may be variously arranged yet based on the nona-cell pattern.

Figure 6:
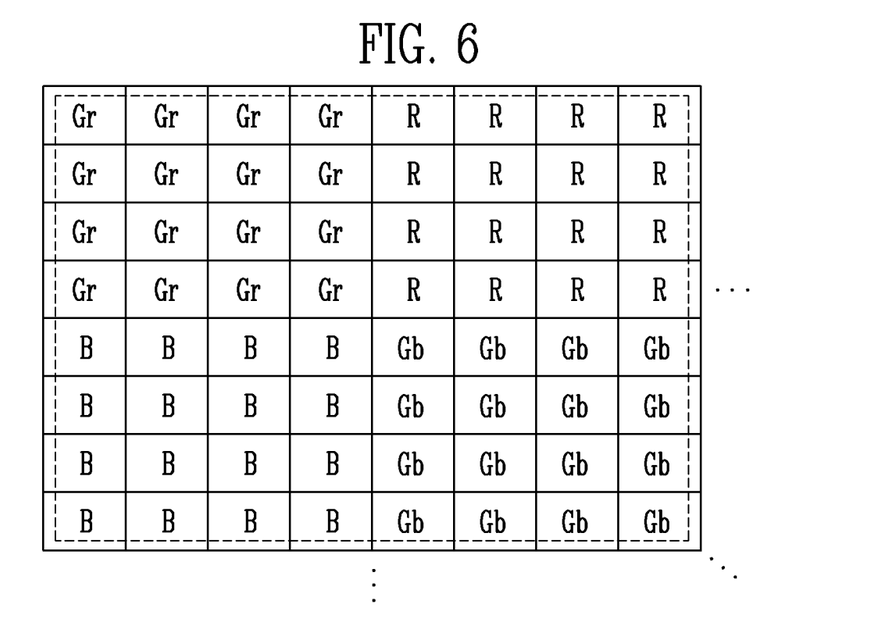
FIG. 6 is a diagram illustrating a hexa-deca pattern of the pixel array of FIG. 2 according to an embodiment of the present disclosure.

FIG. 6 is a diagram illustrating a hexa-deca pattern of the pixel array of FIG. 2 according to an embodiment of the present disclosure.

Referring to FIG. 6, the pixel array 110 may be arrayed in a predetermined pattern. For example, the pixel array 110 may be arrayed in a hexa-deca pattern. As represented in dotted lines in FIG. 6, the hexa-deca pattern may be repetitions of a cell of 8×8 pixels. In each cell, thirty two pixels having green color filters, Gb and Gr, may be diagonally arranged, and sixteen pixels having blue color filters, B, and sixteen pixels having red color filters, R, may be arranged in the remaining corners. The sixty four pixels B, Gb, Gr, and R are not limited to the arrangement shown in FIG. 6, but may be variously arranged yet based on the hexa-deca pattern.

Figure 7:
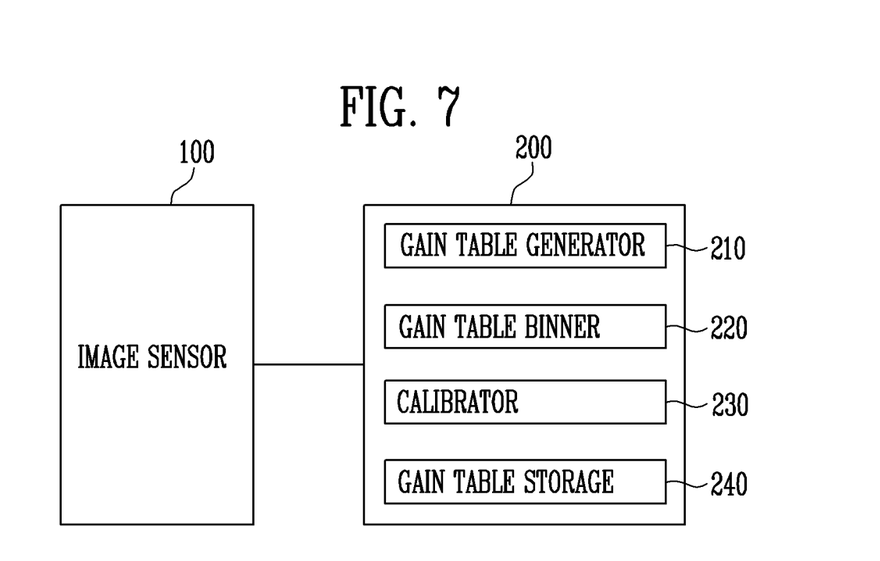
FIG. 7 is a block diagram of an image sensing device according to an embodiment of the present disclosure.

FIG. 7 is a block diagram of an image sensing device according to an embodiment of the present disclosure.

Referring to FIG. 7, the image sensing device may include the image sensor 100 and the image processor 200. The image sensor 100 for obtaining an image using a plurality of pixels may send a plurality of pixel values to the image processor 200. The image processor 200 may cancel noise included in the image based on the plurality of pixel values. The image processor 200 may include a gain table generator 210, a gain table binner 220, a calibrator 230, and a gain table storage 240. The image sensor 100 and the image processor 200 may correspond to what are described in connection with FIGS. 1 and 2.

The gain table generator 210 may use pixel values included in a region of interest included in the image to generate a gain table including gain table values corresponding to a first resolution. In an embodiment of the present disclosure, the gain table generator 210 may generate a gain table used in a calibration operation to reduce noise that occurs in a full resolution of the image, based on the plurality of pixel values. The noise may include maze noise. The maze noise may be a grid type noise caused by differences in pixel values between pixels having the same color among the plurality of pixels. Pixel crosstalk may cause the difference in pixel values between the pixels having the same color.

A region of interest may be a region having a predetermined size around one of intersections of a plurality of grid lines overlaid on the image. The gain table generator 210 may set up a plurality of grid lines to be overlaid on an input image. The gain table generator 210 may set up the predetermined region of interest around the intersection of the grid lines. The gain table generator 210 may generate a gain table corresponding to the full resolution in the region of interest. The gain table generator 210 may generate a gain map of the whole image based on the gain table. Specifically, the gain table generator 210 may use a linear interpolation method to expand the gain table to a gain map.

The gain table may be stored in the gain table storage 240. The gain table generator 210 may generate the gain table by excluding pixel values corresponding to pixels for phase detection auto focus (PDAF) from pixel values included in the region of interest, which will be discussed with reference to FIG. 11.

The gain table may include a plurality of gain regions. Gain table values may each be a value corresponding to each of the plurality of gain regions. The gain table values of the respective gain regions may be each obtained by dividing an average value of pixel values of an identical color to a pixel value corresponding to the gain region by an average value of the pixel values corresponding to the gain region, among the pixel values included in the region of interest. The gain table generator 210 may generate the gain table including the plurality of gain table values.

The gain table binner 220 may convert the gain table into a target table including target table values corresponding to a second resolution. In an embodiment of the present disclosure, the first resolution is higher than the second resolution. The first resolution may be the full resolution, and the second resolution may be a target resolution. For example, the first resolution may be a resolution corresponding to the hexa-deca pattern, and the second resolution may be one of a resolution corresponding to the nona-cell pattern, a resolution corresponding to the quad Bayer pattern, and a resolution corresponding to the Bayer pattern. In an example, the first resolution may be a resolution corresponding to the nona-cell pattern, and the second resolution may be a resolution corresponding to the quad Bayer pattern or a resolution corresponding to the Bayer pattern. The full resolution may be used for high intensity of illumination with sufficient light, and a binned Bayer pattern may be used for low intensity of illumination with insufficient light or for capturing in a video mode.

The target table may include a plurality of calculation regions. Each of the target table values of the respective calculation regions may be an average value of the gain table values, each of which corresponds to the calculation region. The number of gain table values corresponding to the plurality of calculation regions may be determined based on the first resolution and the second resolution. For example, when the first resolution is a resolution corresponding to the hexa-deca pattern and the second resolution is a resolution corresponding to the quad Bayer pattern, the number of table values corresponding to the plurality of calculation regions may be four.

In an embodiment of the present disclosure, each of the target table values of the respective calculation regions is a median of the gain table values corresponding to the calculation region. The number of gain table values corresponding to each of the plurality of calculation regions may be determined based on the first resolution and the second resolution.

The gain table binner 220 may calculate the target table values which are average values of those of the gain table values, which correspond to the plurality of gain regions. In an embodiment of the present disclosure, the gain table binner 220 may calculate medians of those of the gain table values, which correspond to the plurality of calculation regions. A target table value corresponding to a calculation region may be an average value or a median of the gain table values corresponding to the calculation region. The gain table binner 220 may generate a target table including the calculated target table values. In an embodiment of the present disclosure, the number of gain table values may be a positive integer multiple of the number of target table values.

In an embodiment of the present disclosure, the gain table binner 220 may determine gain table values corresponding to a plurality of calculation regions. For example, the first resolution may be a resolution corresponding to the hexa-deca pattern and the second resolution may be a resolution corresponding to the quad Bayer pattern. The gain table binner 220 may determine four gain table values corresponding to one of the plurality of calculation regions based on the first resolution and the second resolution. The four gain table values may be of the same color. The four gain table values may be neighboring gain table values.

The calibrator 230 may perform a calibration operation to cancel noise included in an image based on the target table. The calibrator 230 may apply the target table values to a plurality of pixel values included in the image. For example, the calibrator 230 may multiply the plurality of pixel values included in the image and the target table values in a unit of the second resolution.

In an embodiment of the present disclosure, the calibrator 230 may perform a calibration operation to reduce maze noise that occurs in the second resolution of an input image based on the target table. As a result of the calibration operation of the calibrator 230, color disparity between the pixels having the same color may be reduced. Accordingly, the grid noise may be canceled.

In an embodiment of the present disclosure, the image sensing device 10 may use pixel values included in a region of interest included in the image to generate a gain table including gain table values corresponding to the first resolution. The image sensing device 10 may convert the gain table into a target table including target table values corresponding to the second resolution that is lower than the first resolution. The image sensing device 10 may cancel noise included in the image based on the target table. The target table values may be generated by using an average value or a median of at least two of the gain table values.

Figure 8:
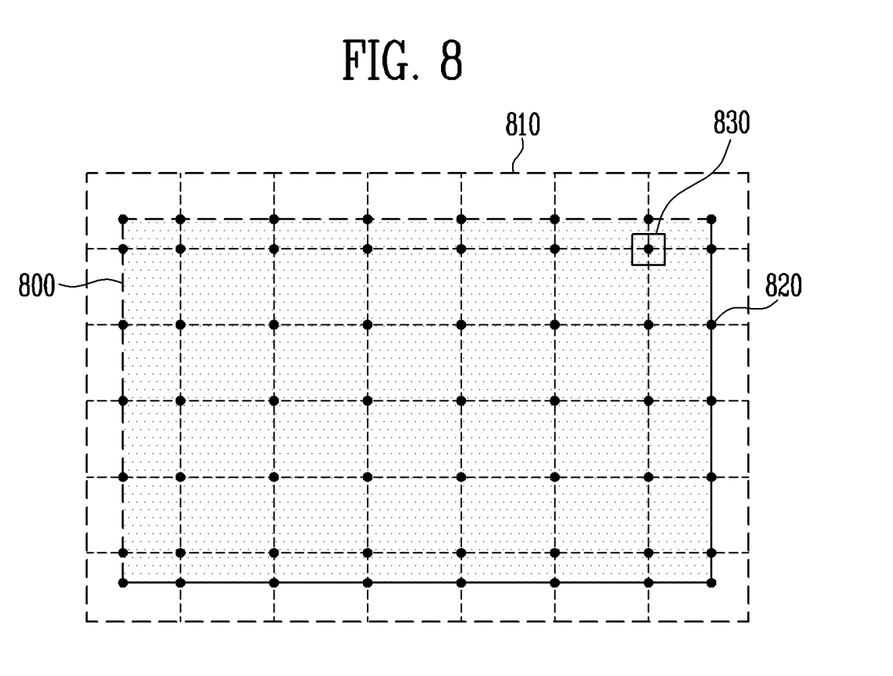
FIG. 8 is a diagram illustrating a region of interest set up according to an embodiment of the present disclosure.

FIG. 8 is a diagram illustrating a region of interest set up according to an embodiment of the present disclosure.

Referring to FIG. 8, a gain table is generated to be used in the calibration operation on part of an input image so that a gain map of the whole image may be derived.

In calculating the calibration gain value, calculating gain values for all of the pixels included in the image may slow down the image processing rate and require large storage space. To increase the image processing rate and save the storage space, a grid method may be used. A plurality of grid lines 810 may be set up in an input image 800. The plurality of grid lines 810 may be overlaid on the image 800. Intersections 820 of the grid lines 810 may be set up on the image 800. A predetermined region of interest 830 may be set up for the intersections 820. The size of the region of interest 830 may be changed depending on the image.

In FIG. 8, there may be a plurality of the intersections 820, so the position of the region of interest 830 may vary. Once a gain table is generated for the region of interest 830, the gain table may be expanded to a gain map for the whole image 800 according to a scheme such as linear interpolation. The region of interest of FIG. 8 may be set up by the gain table generator.

Figure 9:
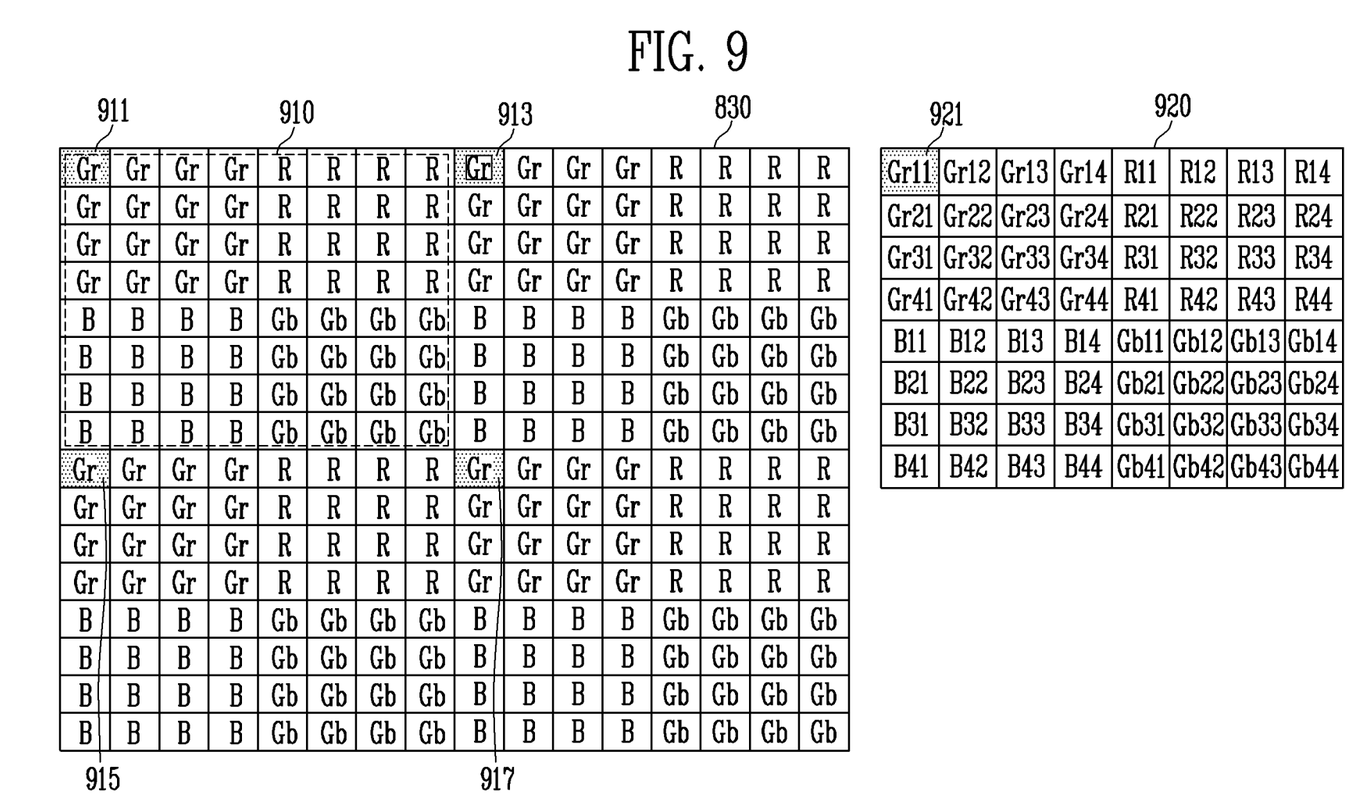
FIG. 9 is a diagram illustrating a method of generating a gain table according to an embodiment of the present disclosure.

FIG. 9 is a diagram illustrating a method of generating a gain table according to an embodiment of the present disclosure.

FIG. 9 illustrates an example in which the first resolution of an input image is a resolution corresponding to the hexa-deca pattern and the size of the region of interest 830 is 16×16 pixels.

The gain table generator may divide the region of interest 830 to correspond to the first resolution. As the full resolution of the image corresponds to the hexa-deca pattern, the region of interest 830 may be divided into four sub-regions. In FIG. 9, a reference number 910 indicates one of the four sub-regions within the region of interest 830.

A gain table 920 may include gain table values corresponding to the plurality of gain regions, respectively. For example, a gain table value may correspond to a gain region 921 of the plurality of gain regions. The gain table value corresponding to the gain region 921 may be a value obtained by dividing an average value of pixel values having the same color as a pixel value (i.e., any one of 911, 913, 915, and 917) corresponding to the gain region 921 by an average value of the pixel values 911, 913, 915, and 917 corresponding to the gain region 921, among the pixel values included in the region of interest. In FIG. 9, when the pixel value (i.e., any one of 911, 913, 915, and 917) corresponding to the gain region 921 has the green color Gr, an average value of the pixel values of the green color Gr included in the region of interest may be calculated. In an embodiment of the present disclosure, the gain table value corresponding to the gain region 921 may be a value obtained by dividing an average value of pixel values having the same color as a pixel value (i.e., any one of 911, 913, 915, and 917) corresponding to the gain region 921 by a median of the pixel values 911, 913, 915, and 917 corresponding to the gain region 921, among the pixel values included in the region of interest.

Likewise, remaining gain table values of the gain table 920 may be calculated. In an embodiment of the present disclosure, color of a pixel included in the image sensor may be any of green Gr and Gb, red R, and blue B. In generating the gain table, the green Gr and Gb pixels are of the same color. Disparity between the green Gr and Gb pixels may cause noise. The operation of generating the gain table in FIG. 9 may be performed by the gain table generator.

Figure 10:
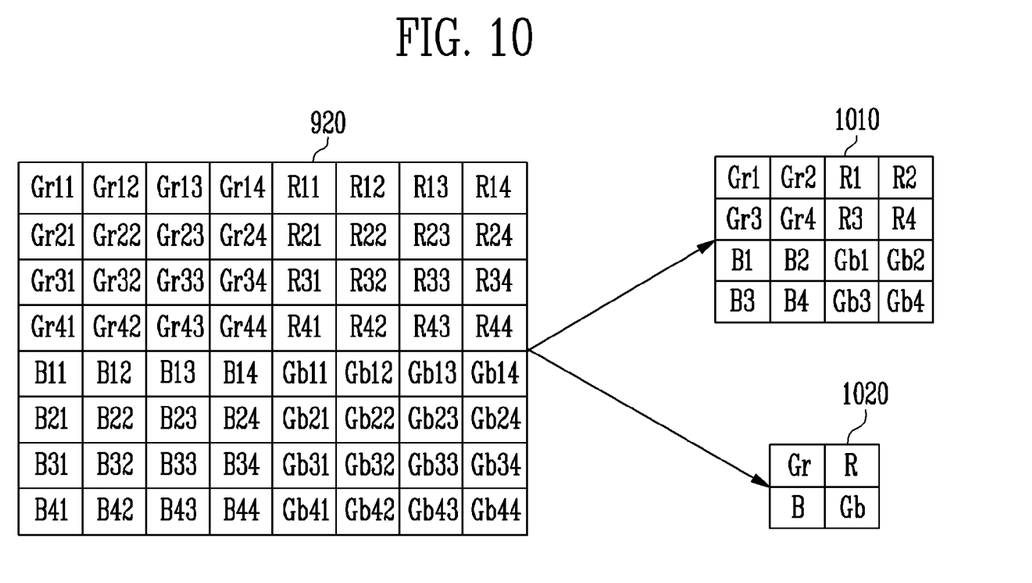
FIG. 10 is a diagram illustrating a method of binning a gain table according to an embodiment of the present disclosure.

FIG. 10 is a diagram illustrating a method of binning a gain table according to an embodiment of the present disclosure.

FIG. 10 illustrates an example in which the first resolution is a resolution corresponding to the hexa-deca pattern and the second resolution is a resolution corresponding to the quad Bayer pattern or the Bayer pattern. The gain table 920 corresponding to the first resolution may go through binning to become a target table 1010 and 1020. A binning method of FIG. 10 may correspond to what is described in connection with FIG. 7.

Referring to FIG. 10, the gain table binner 220 may convert the gain table into a target table including target table values corresponding to the second resolution. The target table may include a plurality of calculation regions. Gain table values may correspond to the plurality of calculation regions. The number of gain table values corresponding to the plurality of calculation regions may be determined based on the first resolution and the second resolution. The gain table binner 220 may determine gain table values corresponding to the plurality of calculation regions.

The gain table binner 220 may calculate the target table values which are average values of those of the gain table values, which correspond to the plurality of gain regions. In an embodiment of the present disclosure, the gain table binner 220 may calculate medians at the center of those of the gain table values, which correspond to the plurality of calculation regions. A target table value corresponding to a calculation region may be an average value or a median of the gain table values corresponding to the calculation region. The gain table binner 220 may generate a target table including the calculated target table values.

Referring to FIG. 10, the gain table 920 may be converted into the target table 1010. The second resolution may be a resolution corresponding to the quad Bayer pattern. The gain table binner 220 may determine four gain table values corresponding to one of the plurality of calculation regions based on the first resolution and the second resolution. The four gain table values may be of the same color. The four gain table values may be neighboring gain table values.

For example, the four gain table values of the same color may go through binning. A table value Gr1 in the target table is expressed as follows: Gr1=(Gr11+Gr12+Gr21+Gr22)/4. Similarly, a table value Gr2 in the target table is expressed as follows: Gr2=(Gr13+Gr14+Gr23+Gr24)/4. Likewise, the remaining table values Gr3, Gr4, R1, R2, R3, R4, B1, B2, B3, B4, Gb1, Gb2, Gb3, and Gb4 of the target table 1010 may be calculated.

Referring to FIG. 10, the gain table 920 may be converted into the target table 1020. The second resolution may be a resolution corresponding to the Bayer pattern. The gain table binner 220 may determine sixteen gain table values corresponding to one of the plurality of calculation regions based on the first resolution and the second resolution. The sixteen gain table values may be of the same color. The sixteen gain table values may be neighboring gain table values.

For example, the sixteen gain table values of the same color may go through binning. A gain table value Gr in the target table is expressed as follows: Gr=(Gr11+Gr12+Gr13+Gr14+Gr21+Gr22+Gr23+Gr24+Gr31+Gr32+Gr33+Gr34+Gr41+Gr42+Gr43+Gr44)/16. Similarly, a gain table value Gb in the target table is expressed as follows: Gb=(Gb11+Gb12+Gb13+Gb14+Gb21+Gb22+Gb23+Gb24+Gb31+Gb32+Gb33+Gb34+Gb41+Gb42+Gb43+Gb44)/16. In the resolution corresponding to the Bayer pattern, disparity occurs only between green colors Gr and Gb, so the remaining table values R and B of the target table 1020 may not be calculated.

In an embodiment of the present disclosure, the gain table binner 220 may perform binning on the gain table corresponding to the first resolution, so the gain table corresponding to the second resolution may not be stored.

In an embodiment of the present disclosure, a gain table value corresponding to a calculation region may correspond to another calculation region. That is, a single gain table value may correspond to a plurality of calculation regions. For example, the first resolution may be a resolution corresponding to the hexa-deca pattern and the second resolution may be a resolution corresponding to the nona-cell pattern. In other words, sixteen gain table values of the same color may go through binning into nine target table values. The nine target table values are expressed in the following equations: (Gr11+Gr12+Gr21+Gr22)/4, (Gr12+Gr13+Gr22+Gr23)/4, (Gr13+Gr14+Gr23+Gr24)/4, (Gr21+Gr22+Gr31+Gr32)/4, (Gr22+Gr23+Gr32+Gr33)/4, (Gr23+Gr24+Gr33+Gr34)/4, (Gr31+Gr32+Gr41+Gr42)/4, (Gr32+Gr33+Gr42+Gr43)/4, and (Gr33+Gr34+Gr43+Gr44)/4.

Similarly, the first resolution may be a resolution corresponding to the nona-cell pattern and the second resolution may be a resolution corresponding to the quad Bayer pattern. In this case, the same nine gain table values may be converted into four target table values.

Figure 11:
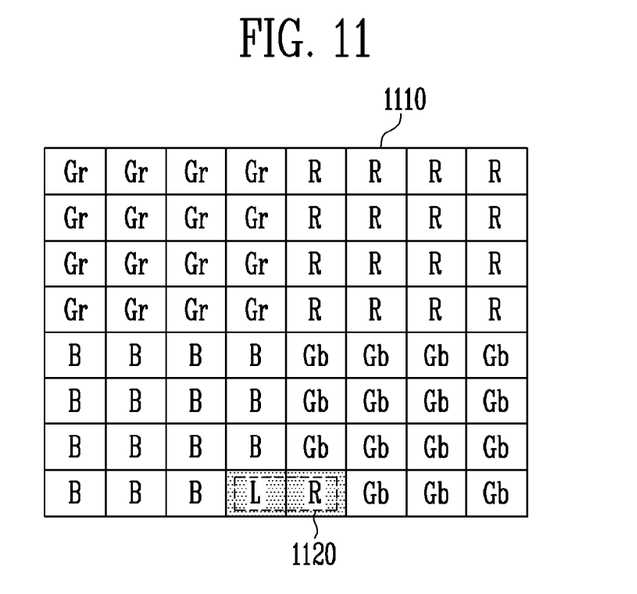
FIG. 11 is a diagram illustrating pixels excluded from generation of a gain table according to an embodiment of the present disclosure.

FIG. 11 is a diagram illustrating pixels excluded from generation of a gain table according to an embodiment of the present disclosure.

Referring to FIG. 11, among pixels included in a sub-region 1110 such as the sub-region 910 of FIG. 9, there may be pixels 1120 that hardly maintain linearity with neighboring pixels. The pixels 1120 that hardly maintain linearity with the neighboring pixels may be a photo diode (PD) pixel for PDAF and its adjacent pixel.

The location of the PD pixel for PDAF may be predetermined by the image sensor. As the PD pixel for the PDAF may have properties changing with the location, the PD pixel may not maintain linearity with its adjacent pixel. As for the PD pixel for PDAF, two pixels may correspond to a lens, i.e., 2×1 on chip lens, or four pixels may correspond to a lens, i.e., 2×2 on chip lens. On the other hand, when it comes to a normal pixel, a single pixel may correspond to a lens, i.e., 1×1 on chip lens.

Referring to FIG. 7, the gain table generator 210 may generate the gain table by excluding the PD pixels for PDAF from pixels included in the region of interest. As the pixels for PDAF have pixel properties changing with a location of the image, the pixels may be unrelated to the performing of the calibration operation to correct color imbalance.

Figure 12:
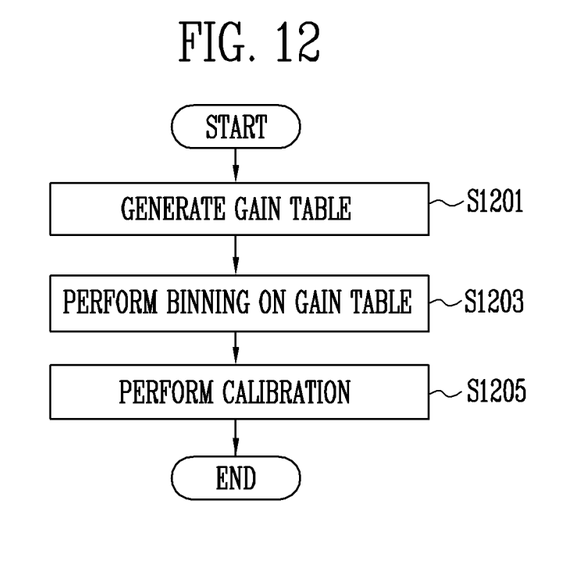
FIG. 12 is a flowchart illustrating a noise calibration method according to an embodiment of the present disclosure.

FIG. 12 is a flowchart illustrating a noise calibration method according to an embodiment of the present disclosure.

In an embodiment of the present disclosure, the image sensing device may perform a calibration operation to cancel noise included in a captured image. The image sensing device may perform the calibration operation by binning a gain table corresponding to the full resolution in a low intensity of illumination or video mode.

At operation S1201, the gain table generator 210 may use pixel values included in a region of interest included in the image to generate a gain table including gain table values corresponding to the first resolution. A region of interest may be a region having a predetermined size around one of intersections of a plurality of grid lines overlaid on the image. The gain table generator 210 may set up a plurality of grid lines to be overlaid on an input image. The gain table generator 210 may set up the predetermined region of interest around the intersection of the grid lines.

The gain table may include gain table values corresponding to the plurality of gain regions, respectively. The gain table generator 210 may calculate gain table values of the respective gain regions each obtained by dividing an average value of pixel values having the same color as a pixel value corresponding to the gain region by an average value of the pixel values corresponding to the gain region among the pixel values included in the region of interest. The gain table generator 210 may generate the gain table including the gain table values.

A method of generating the gain table may correspond to what are described in connection with FIGS. 7, 8, 9 and 11.

At operation S1203, the gain table binner 220 may convert the gain table into a target table including target table values corresponding to the second resolution. The target table may include a plurality of calculation regions. The gain table binner 220 may determine gain table values corresponding to the plurality of calculation regions. The gain table binner 220 may calculate the target table values which are average values of those of the gain table values, which correspond to the plurality of gain regions. In an embodiment of the present disclosure, the gain table binner 220 may calculate medians at the center of those of the gain table values, which correspond to the plurality of calculation regions. The gain table binner 220 may generate a target table including the calculated target table values. A method of generating the target table may correspond to what are described in connection with FIGS. 7 and 10.

At operation S1205, the calibrator 230 may perform a calibration operation to cancel noise included in the image based on the target table. The calibrator 230 may apply the target table values to a plurality of pixel values included in the image. As a result of the calibration operation of the calibrator 230, color disparity between the pixels having the same color may be reduced. Accordingly, the noise may be canceled.

Figure 13:
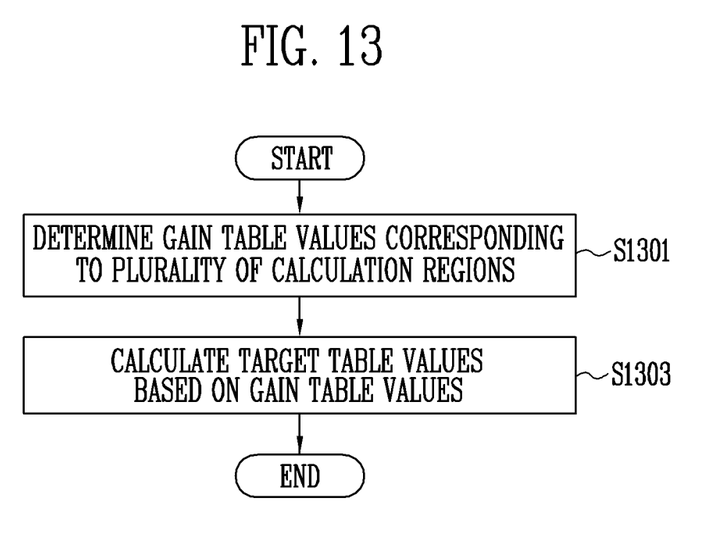
FIG. 13 is a flowchart illustrating a gain table binning method according to an embodiment of the present disclosure.

FIG. 13 is a flowchart illustrating a gain table binning method according to an embodiment of the present disclosure.

The gain table binning method according to the embodiment of the present disclosure may be performed by the gain table binner.

At operation S1301, the gain table binner 220 may determine gain table values corresponding to the plurality of calculation regions. The number of gain table values corresponding to the plurality of calculation regions may be determined based on the first resolution and the second resolution. For example, the first resolution may be a resolution corresponding to the hexa-deca pattern and the second resolution may be a resolution corresponding to the quad Bayer pattern. The gain table binner 220 may determine four gain table values corresponding to one of the plurality of calculation regions based on the first resolution and the second resolution. The four gain table values may be of the same color. The four gain table values may be neighboring gain table values.

At operation S1303, the gain table binner 220 may calculate the target table values based on gain table values corresponding to the plurality of calculation regions. The target table may include a plurality of calculation regions. The gain table binner 220 may calculate the target table values which are average values of those of the gain table values, which correspond to the plurality of gain regions. In an embodiment of the present disclosure, the gain table binner 220 may calculate medians at the center of those of the gain table values, which correspond to the plurality of calculation regions. A target table value corresponding to a calculation region may be an average value or a median of the gain table values corresponding to the calculation region. The gain table binner 220 may generate a target table including the calculated target table values.

The gain table binning method may correspond to what are described in connection with FIGS. 7 and 10.

In an embodiment of the present disclosure, a gain table used in the calibration operation to reduce maze noise in the full resolution of an input image may be generated. The maze noise may be a grid type noise caused by color imbalance between those of the plurality of pixels having the same color. The grid noise may be commonly caused by pixel crosstalk. The crosstalk may have various causes including electron diffusion in a PD, a read circuit, etc.

The imbalance between pixels may appear in a regular pattern, so the color disparity may be eliminated by applying a gain value to each pixel. The target table may be generated by binning the gain table. There is no need to store a plurality of gain tables, so the image processing rate increases and storage space may be saved. Gain tables corresponding to other resolutions are not generated, thereby reducing a time required for calibration.

According to embodiments of the present disclosure, disparity between pixels having the same color may be minimized in a multi-pattern, e.g., a quad Bayer, nona-cell, or hexa-deca pattern, and color disparity between green Gr and Gb pixels may be minimized in the Bayer pattern.

Figure 14:
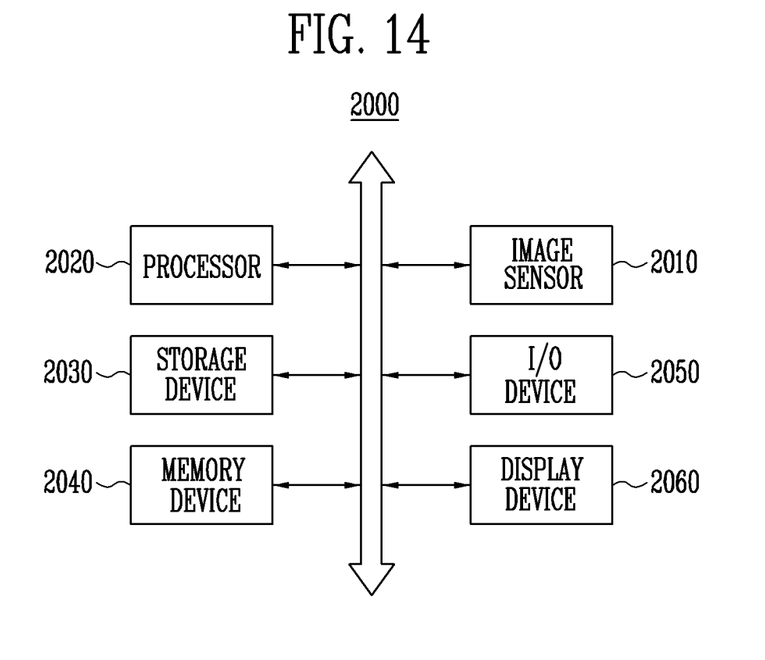
FIG. 14 is a block diagram of a computing system including an image sensor according to an embodiment of the present disclosure.

FIG. 14 is a block diagram of a computing system including an image sensor according to an embodiment of the present disclosure.

Referring to FIG. 14, a computing system 2000 may include an image sensor 2010, a processor 2020, a storage device 2030, a memory device 2040, an input/output device 2050, and a display device 2060. Although not shown in FIG. 14, the computing system 2000 may further include ports for communicating with a video card, a sound card, a memory card, a universal serial bus (USB) device, or other various electronic devices.

The image sensor 2010 may generate image data corresponding to incident light. The display device 2060 may display the image data. The storage device 2030 may store the image data. The processor 2020 may control operations of the image sensor 2010, the display device 2060, and the storage device 2030.

The processor 2020 may perform specific computations or tasks. In an embodiment of the present disclosure, the processor 2020 may be a microprocessor or a central processing unit (CPU). The processor 2020 may be coupled to the storage device 2030, the memory device 2040, and the input/output device 2050 through an address bus, a control bus, and a data bus for communication. In an embodiment of the present disclosure, the processor 2020 may also be coupled to an expansion bus such as a peripheral component interconnect (PCI) bus.

The storage device 2030 may include a flash memory device, a solid-state drive (SSD), a hard disk drive (HDD), a compact disk read-only memory (CD-ROM), and any type of nonvolatile memory device.

The memory device 2040 may store data required for operation of the computing system 2000. For example, the memory device 2040 may include a volatile memory device such as a dynamic random access memory (DRAM) and a static random access memory (SRAM), and a nonvolatile memory device such as an erasable programmable ROM (EPROM), an electrically erasable programmable ROM (EEPROM), and a flash memory device.

The input/output device 2050 may include an input means such as a keyboard, a keypad, a mouse and the like, and an output means such as a printer, a display and the like.

The image sensor 2010 may be coupled to the processor 2020 via the buses or other communication links for communication.

The image sensor 2010 may perform binning on a plurality of pixel data generated from a plurality of pixels included in a pixel array to generate binned pixel data uniformly distributed in the pixel array.

The image sensor 2010 may be implemented in various types of packages. For example, at least some of the components of the image sensor 2010 may be implemented by using packages such as a package on package (PoP), ball grid arrays (BGAs), chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), a thin quad flatpack (TQFP), a small outline integrated circuit (SOIC), a shrink small outline package (SSOP), a thin small outline pack (TSOP), a system in package (SIP), a multi chip package (MCP), a wafer-level fabricated package (WFP), a wafer-level processed stack package (WSP), etc.

The image sensor 2010 may be integrated with the processor 2020 in a single chip or the image sensor 2010 and the processor 2020 may be integrated separately in different chips, depending on embodiments of the present disclosure.

In the meantime, the computing system 2000 should be construed as any computing system that uses the image sensor 2010. For example, the computing system 2000 may include a digital camera, a mobile phone, a PDA, a PMP, a smartphone, etc.

According to the present disclosure, an image sensing device may be provided to perform improved grid noise cancellation.

Although an image sensing device and an operating method thereof have been described with reference to the specific embodiments, these are merely examples, and the present disclosure is not limited thereto, and should be interpreted to have the widest scope according to the basic idea disclosed in the present specification. Those skilled in the art may carry out unspecified embodiments by combining and substituting the disclosed embodiments, but these also do not depart from the scope of the present disclosure. In addition, those skilled in the art may easily change or modify the embodiments disclosed based on the present specification, and it is apparent that such changes or modifications also fall within the scope of the present disclosure and the following claims. Furthermore, the embodiments may be combined to form additional embodiments.

What is claimed is:

1. An image processing device comprising:
    a gain table generator configured to use pixel values included in a region of interest included in an image to generate a gain table including gain table values corresponding to a first resolution;
    a gain table binner configured to convert the gain table into a target table including target table values corresponding to a second resolution; and
    a calibrator configured to perform a calibration operation of cancelling a noise included in the image based on the target table.

2. The image processing device according to claim 1, wherein:
    the gain table comprises a plurality of gain regions, and
    the gain table values are values corresponding to the plurality of gain regions, respectively.

3. The image processing device according to claim 2, wherein the gain table values of the respective gain regions are each obtained by dividing an average value of pixel values of an identical color to a pixel value corresponding to the gain region by an average value of the pixel values corresponding to the gain region, among the pixel values included in the region of interest.

4. The image processing device according to claim 3, wherein the gain table generator is configured to generate a gain map of the whole image based on the gain table.

5. The image processing device according to claim 1, wherein the gain table generator is configured to generate the gain table based on the pixel values other than the pixel values corresponding to pixels for phase detection auto focus (PDAF) in the region of interest.

6. The image processing device according to claim 1, further comprising a gain table storage configured to store the gain table.

7. The image processing device according to claim 1, wherein the first resolution is higher than the second resolution.

8. The image processing device according to claim 1, wherein a number of the gain table values is a positive integer multiple of a number of the target table values.

9. The image processing device according to claim 1, wherein:
    the first resolution is a resolution corresponding to a hexa-deca pattern, and
    the second resolution is one of a resolution corresponding to a nona-cell pattern, a resolution corresponding to a quad Bayer pattern, and a resolution corresponding to a Bayer pattern.

10. The image processing device according to claim 1, wherein:
    the first resolution is a resolution corresponding to a nona-cell pattern, and
    the second resolution is a resolution corresponding to a quad Bayer pattern, or a resolution corresponding to a Bayer pattern.

11. The image processing device according to claim 1, wherein:
    the target table comprises a plurality of calculation regions, and
    each of the target table values of the respective calculation regions is an average value of the gain table values corresponding to the calculation region.

12. The image processing device according to claim 11, wherein a number of the gain table values corresponding to the plurality of calculation regions is determined based on the first resolution and the second resolution.

13. The image processing device according to claim 1, wherein:
- the target table comprises a plurality of calculation regions, and
- each of the target table values of the respective calculation regions is a median of the gain table values corresponding to the calculation region.

14. The image processing device according to claim 13, wherein a number of the gain table values corresponding to the calculation region is determined based on the first resolution and the second resolution.

15. The image processing device according to claim 1, wherein the calibrator is configured to apply the target table values to a plurality of pixel values included in the image.

16. The image processing device according to claim 1, wherein the calibrator is configured to multiply a plurality of pixel values included in the image and the target table values in a unit of the second resolution.

17. The image processing device according to claim 1, wherein the noise comprises a grid noise caused by crosstalk between the plurality of pixels.

18. The image processing device according to claim 1, wherein the region of interest is a region having a predetermined size around one of intersections of a plurality of grid lines overlaid on the image.

19. An image sensing device comprising:
- an image sensor configured to obtain an image using a plurality of pixels; and
- an image processor configured to:
- use pixel values included in a region of interest included in the image to generate a gain table including gain table values corresponding to a first resolution,
- convert the gain table into a target table including target table values corresponding to a second resolution which is lower than the first resolution, and
- cancel a noise included in the image based on the target table,
- wherein each of the gain table values indicates a ratio of a first value to a second value,
- wherein the first value is an average pixel value of first pixels corresponding to a gain region which is included in the gain table, and
- wherein the second value is an average pixel value of second pixels whose color is the same as a color of the first pixels in the region of interest.

20. The image sensing device according to claim 19, wherein the target table values are generated by using an average value or a median of at least two of the gain table values.

* * * * *